Jan. 25, 1966

P. A. CARLSTRÖM ETAL 3,231,676

CIRCUIT FOR SELECTION OF ALTERNATIVE PATHS IN TELEPHONE NETWORKS

Filed Dec. 1, 1961

6 Sheets-Sheet 6

United States Patent Office 3,231,676
Patented Jan. 25, 1966

3,231,676
CIRCUIT FOR SELECTION OF ALTERNATIVE PATHS IN TELEPHONE NETWORKS

Per Alfred Carlström and Per-Arne Mannby, Hagersten, Sweden, assignors to Telefonaktiebolaget L M Ericsson, Stockholm, Sweden, a corporation of Sweden Filed Dec. 1, 1961, Ser. No. 156,407
Claims priority, application Sweden, Dec. 17, 1960, 12,238/60
5 Claims. (Cl. 179—18)

This invention relates to automatic telephone systems having a plurality of exchanges arranged in a network. The telephone exchanges are interconnected by means of groups of lines or speech channels. In such a system, a multiplicity of alternate routes or connection paths is present. Many of them are unsuitable because, for instance, they possess too great a total line attenuation or are unnecessarily expensive. The present invention refers to means for extending a telephone connection through an intermediate exchange over a free line in one of a group of preferred and alternate routes emanating from the intermediate exchange and to exclude all unsuitable routes.

It is known to arrange a short cut between two exchanges in a network which short cut is selected principally for connections between said exchanges and is capable of carrying a large volume of traffic. When the short cut is blocked, the connections are directed through one or more intermediate exchanges or offices in the network. It is also known, especially from railway telephone systems, to set up a register in each intermediate exchange that takes part in the setting up of a connection and to both release the connection and return a revertive signal when all of the outgoing lines or trunks from the last connected exchange are busy. This causes the preceding exchange to select another outgoing route, if such one exists and is not blocked or previously tested. In each intermediate exchange only the routes determined by the number of the called exchange are tested, with the exception of route through which the call arrived.

The invention relates to automatic telephone exchanges in telephone networks in which connections are controlled by registers and in which an intermediate exchange contains selectors, means for setting these selectors, means for identifying that route to which an incoming junction line pertains, and means for receiving signals from said registers through said junction line, which signals indicate the office code or designation of the called exchange.

The purpose of the invention is achieved with the aid of a translator in the intermediate exchange and means for transmitting the incoming line identification and the called office code signals to registering means in the translator. Circuits in the translator combine the registration of the identification with the registration of the called office designating signals and both determine those traffic routes outgoing from the intermediate exchange which may be selected when setting up the connection and control the selectors of the intermediate exchange.

The invention is described below with reference to the enclosed drawings, FIGS. 1–9.

Figure 1:
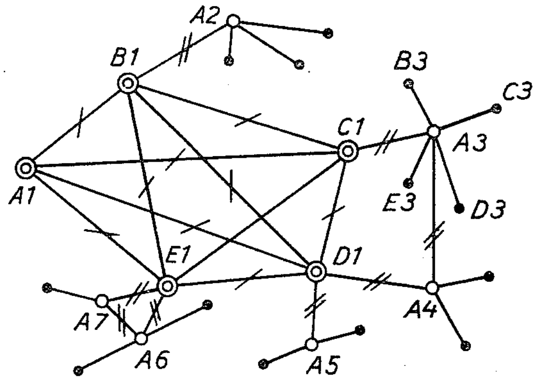
FIG. 1 shows a main telephone network having five exchanges A1, B1, C1, D1, E1 and a number of subordinate networks each provided with a main exchange A2, A3, A4, A5, A6, A7 and a number of sub-exchanges, for example B3, C3, D3, E3 and having short cuts between certain main exchanges, for example A3–A4.

In FIG. 1 the exchanges A1 . . . E1 are trunk intermediate exchanges and from each such exchange direct lines emanate to all the other exchanges. The main exchanges A2 . . . A7 in the subordinate networks have each a grooup of direct lines to the nearest intermediate exchange in the main network.

As appears from the figure, three various types of junction lines are present, viz. those which are marked with one stroke and are called first class lines and connect two intermediate exchanges in the main network, those which are marked with two strokes and are called second class lines and connect the main exchanges mutually or with the main network, and those which are unmarked and connect the sub-exchanges in the networks with respective main exchange. In such a network it is for example made a condition that no telephone connection may contain more than three lines of class 2 and no more than two lines of class 1.

If a connection is assumed to be wanted from A3 to A7 a plurality of connection paths can be considered. The normal route is A3–C1–E1–A7. If now the route C1–E1 is blocked, a connection A3–C1–D1–E1–A7 may be connected or any one of the connections A3–C1–B1–E1–A7 and A3–C1–A1–E1–A7. Should the route D1–E1 be blocked simultaneously with the route C1–E1, a connection A3–C1–D1–B1–(alternatively A1)–E1 must not be connected, for example for the sake of stability. If the route A3–C1 is blocked, a connection A3–A4–D1–E1–A7 may be established or A3–A4–D1–A1–(alt. B1)–E1–A7, but not a connection A3–A4–D1–E1–A6–A7. Calls coming to one of the exchanges A1 . . . E1 through a line of class 1 must accordingly be connected directly to the one of the intermediate exchanges A1 . . . E1 which the calling number of the connection indicates, without use of alternative selection. Calls arriving through a line of class 2 have on the contrary, the opportunity of using alternative selection of any outgoing route of class 1 and with the only exception of the line on which the call arrives. Upon selection between the connection paths E1–A7 and E1–A6–A7, alternative selection may always occur provided that two lines of class 2 have not been previously included in the connection.

The representative conditions stated above have the consequence that alternative selection at the intermediate exchange is either permitted through all available routes except that through the call arrives or no alternative selection whatever is permitted.

Figure 2:
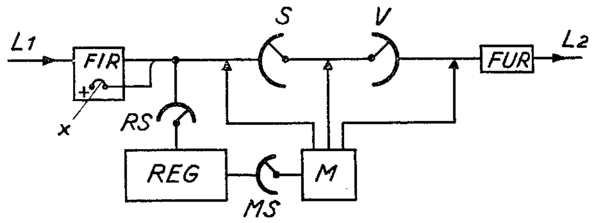
FIG. 2 shows an intermediate exchange with registers REG.

FIG. 2 shows a general diagram of an intermediate exchange, for example E1. An incoming line L1 has a line equipment FIR and an outgoing line L2 has a line equipment FUR. Incoming and outgoing lines are interconnected by means of selectors S and V. The incoming lines are connected to registers REG through register finders RS, and the registers are connected to markers M through a selector MS.

Upon calls, the line L1 is connected through RS to a register REG. The finder RS indicates by its position which line is calling and to which route this line pertains. Through a particular conductor $x$ the class is marked, for example class 1, to which the line L1 belongs. This signal is received and registered in REG. Then the register receives and registers signals which arrive through the line L1 and which indicate the number or designation of the called exchange, for example A7. The register translates the signals received and determines through the combination of the registrations to which route the call shall be connected. Signals which indicate this route are transmitted to the marker M which establishes the connection. Then the line L1 is selected by means of an identifying circuit which emanates from the marker M and goes through the selector MS, the register REG and the finder RS. If the line L1 is a line pertaining to class 2, the register will obtain no signal through the conductor *x* but notes the position of the finder RS as a representation of the route through which the call arrives, after which the marker is set for alternative selection through all the other routes outgoing from the exchange.

Figure 8:
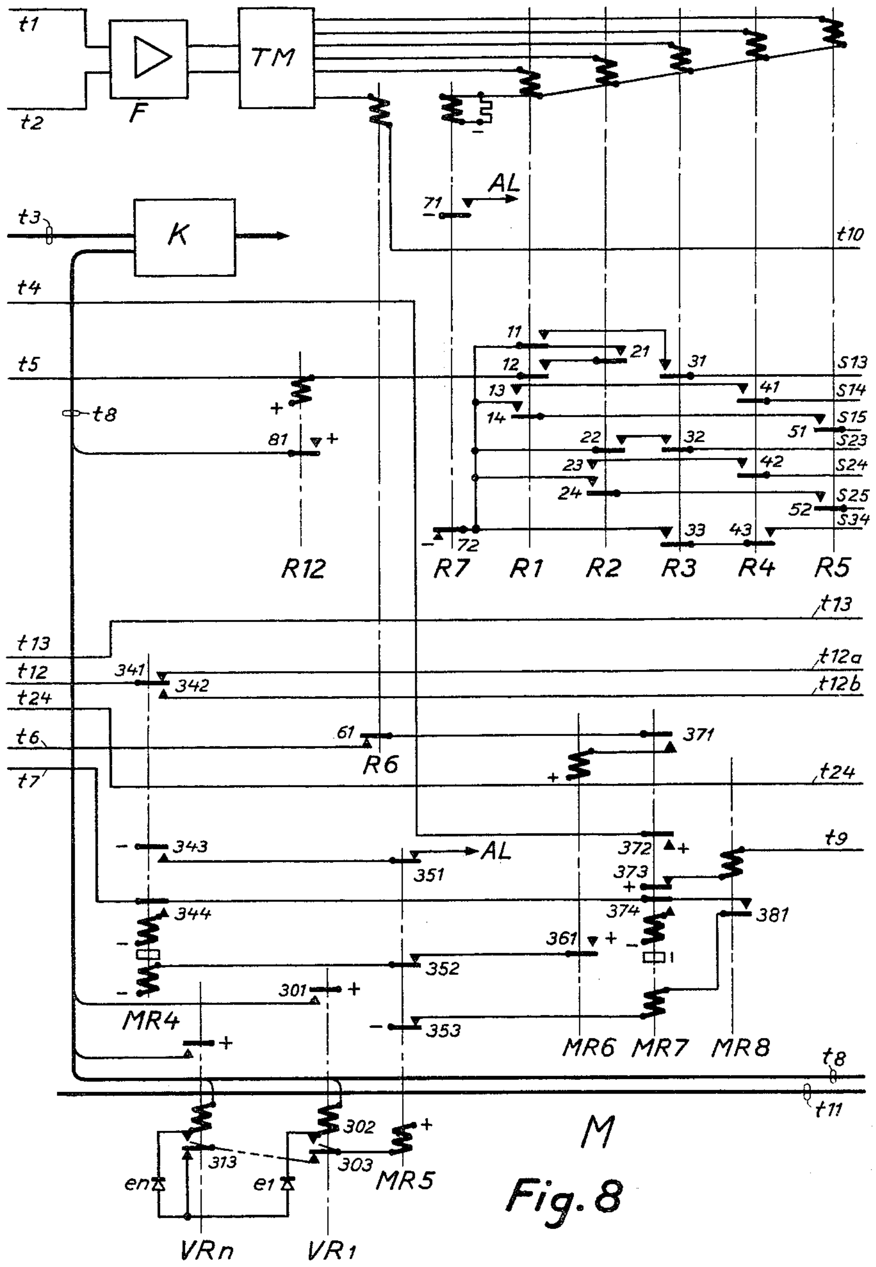

Particular means which will be described later in connection with FIG. 8 are provided in the marker M which, when a roundabout route is selected, will send a particular revertive signal through the connection. This signal is received and registered in the register that has sent the numerical signals for the exchange A7 to the register REG in FIG. 2. If this register has already received such a signal which indicates that a roundabout route has been selected, the connection will be disconnected.

Figure 3:
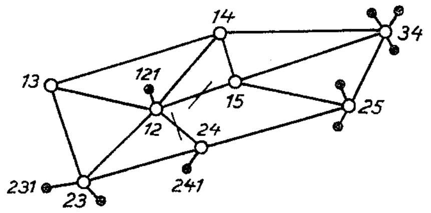
FIG. 3 shows an arbitrarily built network having 8 exchanges.

FIG. 3 shows an arbitrary network, for example a main network corresponding to the exchanges A1 . . . E1 in FIG. 1, although provided with 8 exchanges, in which direct routes do not exist between all exchanges. It will not be sufficient in this case to decide whether alternative selection may exist or must not exist, but in at least certain cases in which alternative routes exist, some route besides that through which the call arrives must be excluded as an alternative selection. It is is for example assumed that those routes which in the figure are marked with one stroke, have lines with low attenuation while the other routes have lines with rather high attenuation. A call from the exchange 24 which is directed to the exchange 34 is supposed to arrive at the exchange 12. Connection shall in the first place be established through the exchange 15 and in the second place through the exchange 14 while the routes to the exchanges 13 and 23 are excluded. If calls directed to the exchange 34 come to the exchange 12 from one of the exchanges 13 or 23, the connection must not be connected through a route other than that which goes through the exchange 15. The calls from the exchange 23 can come to the exchange 12 via the exchange 24.

The intermediate exchanges, for example 12, 23, 24 are as a principle built according to FIGS. 4, 6–9. Each intermediate exchange is interconnected with one or more local exchanges. A local exchange, for example 241, connected to the intermediate exchange 24, or 231 connected to 23, is assumed to be designed according to FIG. 5. The translator according to FIG. 9 relates to the intermediate exchange 12.

Figure 4:
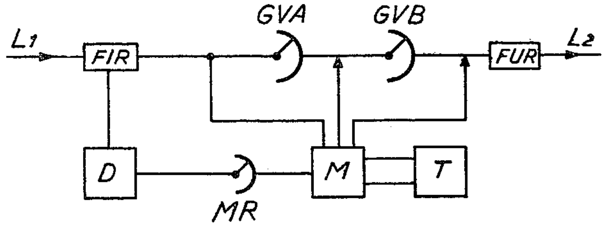
FIG. 4 shows an intermediate exchange without registers.
Figure 5:
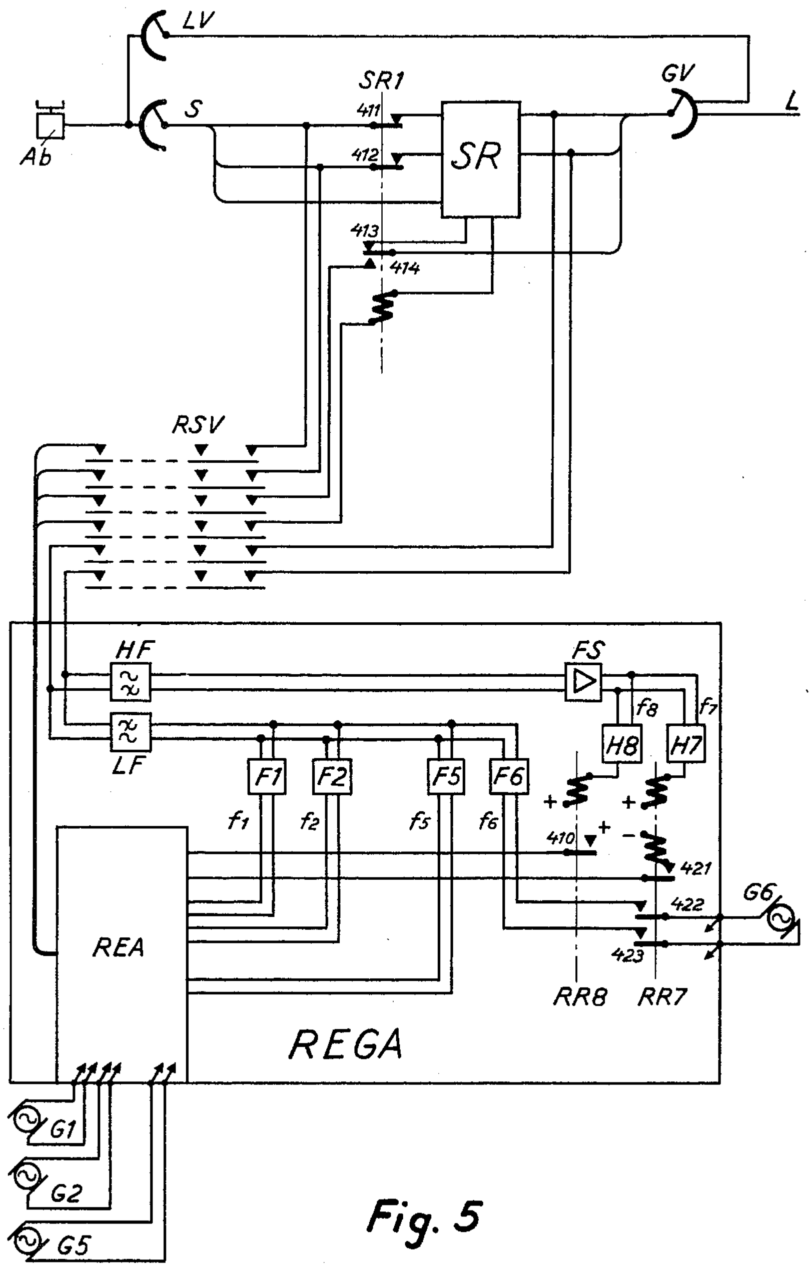
FIG. 5 shows a local exchange.

FIG. 4 shows an incoming line L1 having a line equipment FIR, an outgoing line L2 provided with a line equipment FUR, a pair of selectors GVA, GVB for interconnection of incoming and outgoing lines, an identifier D, a marker M and a translator T. As more than one marker is required, there is provided a selecting means MR that connects the identifier D with various markers. The local exchange according to FIG. 5 contains conventional line finders S, group selectors GV, line selectors LV, and connecting circuits composed of a relay set or link circuit SR and a switching relay SR1. The connecting circuits are connected by means of register finders RSV to registers REGA which are designed for controlling the extension of connections throughout the whole network in FIG. 3 with the aid of voice frequency signals. The register REGA contains registering means and relays REA, RR7, RR8. Subscribers' instruments A*b* are connected to the local exchange. The registers REGA can be local registers but preferably are special registers of the type shown in FIG. 4 of United States Patent No. 2,761,901 for controlling the extension of outgoing telephone connections. These registers are seized, for example, by dialing the access digit 0. In FIG. 5, it is assumed that REGA also connects local calls through the group selector GV and the line selector LV. An outgoing call from the subscribers' instrument A*b* in FIG. 5 is connected through a finder S, the relay SR1 and the register finder RSV to the register REGA. The relay SR1 is operated when the register is seized and actuates contacts 411–414 which divide the connection between the finder S and the group selector GV into an input and an output side. The number of the called exchange is sent by means of dial pulses or signals to the register and is registered in the registering means REA. After receiving of at least the number of the called intermediate exchange, the register REGA sends a voice frequency signal consisting of two voice frequencies which, in combination, indicate the called intermediate exchange. For 8 intermediate exchanges 5 voice frequency signals are required which are assumed to have the frequencies $f1$–$f5$ and are separated by means of conventional filters F1–F5. An additional filter F6 for a voice frequency $f6$ is used when sending a signal which indicates that a roundabout route is being connected, whereby further roundabout routes should not be selected. The voice frequencies $f1$–$f6$ belong to a lower frequency band passing a low pass filter LF. Incoming revertive voice frequency signals pass a high pass filter HF, are amplified in an amplifier FS, are received in voice frequency receivers H7–H8, and actuate relays RR7 and RR8, respectively. The frequencies $f1$–$f6$ are generated by voice frequency generators G1–G6.

The register REGA sets the group selector GV whereby a line L outgoing from the local exchange, such as the exchange 241 in FIG. 3, is selected. The line L connects the local exchange 241 with the intermediate exchange 24 which receives the voice frequency signal that indicates the intermediate exchange terminating trunks to the called local exchange, for example 34. The intermediate exchange 24 extends the communication channel or path to the incoming line L1 (FIG. 6) in the exchange 12. The office 12 includes line equipment FIR for the incoming line and operating bar GVA of a cross bar switch with the operating bar magnet VMI pertaining to the line L1. The relays **A1–A6, B1–B*n*, C1–C6 constitute an identifier D, and the relays MK1–MK2 form a selector for the selection of one marker out of two available markers. The relays A1–A6 and B1–B*n* form two relay chains. In each relay chain, only one relay at a time can remain operated. Each relay C1–C6 has a secondary relay in the relay chain A1–A6 representing a traffic route. The relays B1–B*n*** mark a calling line within the routes.

Figure 9:
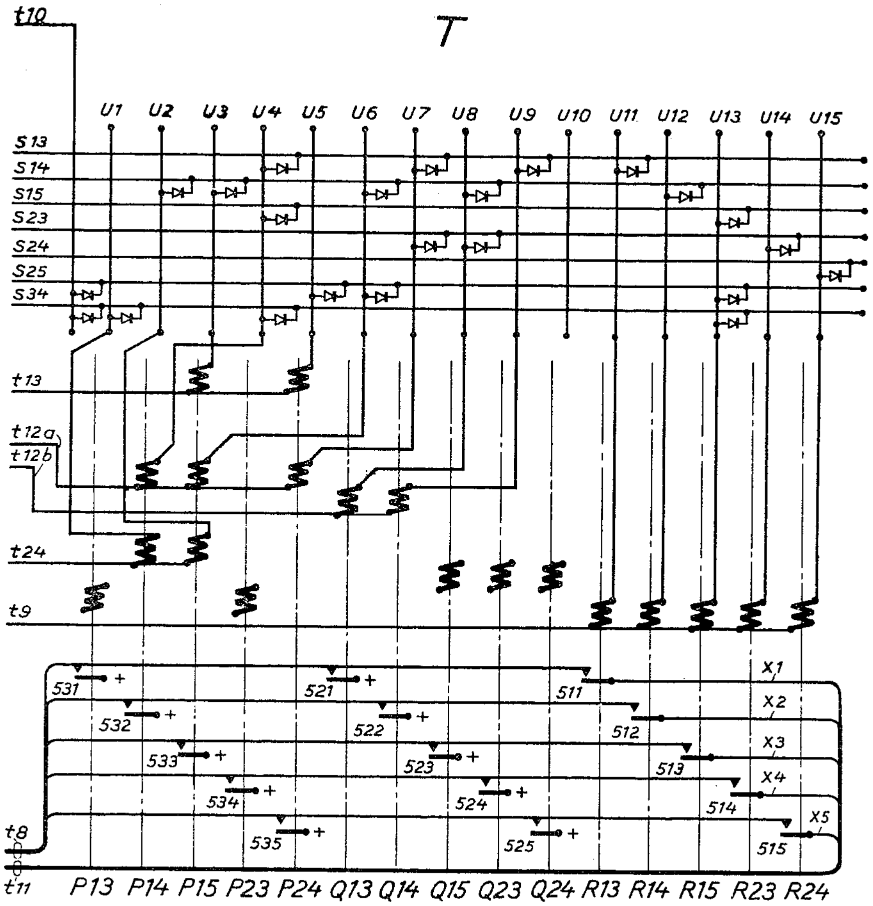

The translator T in FIG. 9 contains three groups of relays R13–R24, P13–P24 and Q13–Q24. Each group contains a relay for each route that emanates from the exchange 12 to other intermediate exchanges, viz. 13, 14, 15, 23 and 24. The relays R13–R24 are used to select the route that shall be selected in the first place, the relays P13–P24 are used for the route that shall be selected in the second place and Q13–Q24 for the route that shall be selected in the third place. The third selecting possibility occurs only on calls going out from a local exchange, for example 121, pertaining to the intermediate exchange 12. For incoming calls to local exchanges connected to the intermediate exchange 12, no alternative selection exists and for the called exchange number 12 there is provided a particular relay R12 in FIG. 8.

Each intermediate exchange except the exchange 12 is assigned one of a plurality of horizontal conductors *s*13–*s*34 in the translator T. For the alternative selecting possibilities, there are provided vertical conductors *u*1–*u*15 which each are connected to the one side of a winding of one of the relays R13–R24, P13–P24, Q13–Q24. The other side of said windings is connected to the wire *t*13, *t***12*a***, *t***12*b***, *t*24 and many more which each correspond to a traffic route or group of traffic routes.

arriving at the intermediate exchange 12. The wire *t9* is common to all routes. By means of rectifiers, the vertical wires *u1*–*u15* are connected with the horizontal wires *s13*–*s34*. The contacts 511–515, 521–525, 531–535 are with the wire *x1*–*x5* connected with cut off contacts 268–218 on the relays MR16–MR11 which prevent selection in that route over which the incoming call arrives.

When a call arrives on the line L1, positive voltage is connected to the wire *c1*, and the group relay C1 operates in a circuit through the contact 101, the rectifier *e1*, the winding of C1, the resistance *r1*, to negative. The contact 110 is closed. All lines in the traffic route between the exchanges 24 and 12 have a contact 115–119 on the relay A1. When the contact 110 is closed, the relay A1 operates in the following circuit: positive voltage, the contact 110, the winding of the relay A1, the rectifier *e11*, the contact chain 133-123, 113 to negative. The contacts 111–119 are actuated. The relay B1 is operated in the following circuit: positive voltage, the contacts 101, 119, the winding of the relay B1, the rectifier *e21*, the contact chain 142–152, to negative. The contacts 141–143 are actuated. At the same time, for example, the relay MK2 operates in the following circuit: positive voltage, the contacts 112, 173, 163, the rectifier *e32*, the winding of the relay MK2, the wire *m*, the contact 203, to negative. The contacts 161–168 are actuated. The relay MR11 in the marker M, FIG. 7, operates in the following circuit: positive voltage, positive voltage, the contacts 111, 166, the wire *v11*, the winding of the relay MR11, to negative. The contacts 211–217 are actuated. The relay MR21 operates simultaneously in the circuit: positive voltage, the contacts 141, 161, the wire *v21*, the winding of the relay MR21, to negative. The contacts 221–225 are actuated. The relay MR1 operates with current through the contacts 224, 215, the wire *c*, the contact 101 and the wire *c1*. The contacts 201–204 are actuated. The relay C1 is shunted and releases in consequence of the fact that positive voltage is connected directly to the resistance *r1* through the wire *g*, the contacts 214 and 201. The relays A1, B1 and MK2 will also release so that the identifier D is released and can connect calls from other routes, namely those which correspond to the reyas A2-A6, to the other marker. The marker M and the group of lines corresponding to the relay A1 are however marked occupied until the operating bar magnet VM1 has operated. In the marker M (FIG. 7), the relays MR11 and MR21 are held by means of holding windings and the contacts 217 and 225, respectively, and 202.

The line L1 is hereby connected to the marker M and the voice frequency signal that indicates the called intermediate exchange passes through the speech wires *a*, *b*, the contacts 211, 212; 221, 222; 231, 233; 241, 243; and the wires *t1*, *t2* to an amplifier F and a voice frequency receiver TM in FIG. 8. The amplifier F amplifies signals of all of the received frequencies and applies the composite amplified output signal to the unit TM which separates and separately amplifies the different voice frequency signals supplied by the register REGA in the local office (FIG. 5). These different frequency signals control the selective operation of a group of relays R1–R7. According to the signal system used in the illustrated system, exactly 2 of the relays R1–R5 are operated to represent a complete received called office code. In the illustrative example, the relays R3 and R4 are operated representing the called intermediate exchange 34. If none or only one of the relays R1–R5 is operated, the marker will be released by a time arrangement AL which is started when the contact 204 is closed. This occurs by releasing the relay MR1 by a circuit through its lower counteracting winding. If more than two of the relays R1–R5 are operated, the margin relay R7 will operate to actuate contacts 71–72. The contact 72 prevents a connection from being established, and the contact 71 starts the timer arrangement AL which releases the marker M. AL is suitably connected with means for registering the reason why a connection has not been established. The connection between the register REGA and the line L1 is disconnected by a time arrangement in a REGA in known manner.

If it is assumed that only the relays R3 and R4 are operated, the contacts 31–33 and 41–47 are actuated. The following circuit is completed: positive voltage, contact 373, the winding of the relay MR8, the wire *t9*, the winding of the relay R15, the wire *u13*, a rectifier, the wire *s34*, the contacts 43, 33 and 72, to negative. The relay MR8 and the relay R15 that correspond to the line route from the exchange 12 to the exchange 15 operate. The contact 513 is actuated and closes a circuit from positive voltage through a conductor in each of the bundles of conductors *t11* and *t8* to the connecting relays K of the marker which connect marking wires for the selectors and test wires for all lines in the line route to the exchange 15 to the selecting relay chain VR1–VR*n*. The circuit K is of the type described in detail in United States Patent No. 2,761,901 and shown in FIG. 5 of the drawings of this patent. Each of the test wires is connected to a relay in the selecting relay chain and this is so designed that only one selecting relay at a time can operate. If the line lying first in the route is free, the relay VR1 will operate in a circuit through the winding of the relay MR5, the contacts 303–311, the rectifier *e1*, the winding of the relay VR1, a test wire in the bundle of conductors *t8*, to negative, through connecting contacts in K and a contact for free-marking of the free line. The relays VR1 and MR5 operate. The contacts 301–303 and 351–353 are actuated. In a circuit through the contact 301 and contacts on the connecting relays in K the selected line will be marked. At the same time the calling line L1 is marked by means of a circuit through a wire *d1* in the bundle of conductors *t3*, the contacts 223 and 213, the wire *d*, the lower winding of the operating bar magnet VM1, to negative. The operating bar magnet VM1 does not operate for the present in this circuit. After marking those two lines which are to be interconnected in the exchange 12, the interconnection takes place in a manner known per se by means in the circuit K by which positive voltage is connected to the wire *d1*. The operating bar magnet VM1 now operates. The contacts 101–102 are actuated. The magnet VM1 is then maintained energized by means of current through the wire *c1* and the contact 102. When the current through the wire *c* is interrupted by the contact 101, the relay MR1 and the marker are released.

If the call from the exchange 241 to the intermediate exchange 34 after being connected to the exchange 12 according to the description above, finds all lines to the exchange 15 busy, the selecting relays VR1–VR*n* and the relay MR5 are not operated. When the relay MR8 operated, the contact 381 was closed and the following circuit is completed for the slow-to-operate relay MR7: positive voltage, the contact 202, the wire *t7*, the contact 381, the winding of the relay MR7, the contact 353, to negative. As the relay MR5 does not interrupt this circuit, the relay MR7 will operate. The contacts 371–374 are actuated. The contact 373 interrupts the circuit through the wire *t9* to the relays R13–R24. The relay MR7 is held in a circuit through the contact 374 and the upper winding of the relay. The contact 372 closes a circuit through the wire *t4* to the relay MR3 which operates. The contacts 241–244 are actuated and a voice frequency signal with the frequency *f7* is sent from the voice frequency generator G7 to the register REGA in the originating exchange 241 to operate the relay RR7. The contacts 421–423 (FIG. 5) are actuated after which the relay RR7 is held by an auxiliary winding and its contact 421 and a voice frequency with the frequency *f6* is connected to the connection in order to indicate that a roundabout route is now being connected.

In the marker M (FIG. 8), the contact 371 is closed in the following circuit: positive voltage, the winding of the relay MR6, the contacts 371 and 61, the wire *t6*, the contact 216, the wire *t24* that indicates that the call arrives from the exchange 24, the lower winding of the relay P14, the wire *u1*, a rectifier, the wire *s34*, the contacts 43, 33 and 72, to negative. The relay MR6 and the relay P14 operate. The contact 361 and the contact 532 are closed and through a wire in the bundle of conductors *t8* a connecting relay in the relay means K is operated to attempt to select a free line to the intermediate exchange 14. If there is a free line in this route, the line L1 is connected to this line in the manner described above for the selection of a line extending to the exchange 15. If, however, there is no free line to the exchange 14, the slow-to-operate relay MR4 will operate in the following circuit: positive voltage, the contacts 361 and 352, the lower winding of the relay MR4, to negative. The contacts 341–344 are actuated. The time arrangement AL is operated in a circuit through the contacts 343 and 351 and releases the marker as has been described above.

If it is assumed that a call to the exchange 34 emanates from the local exchange 231 and that there is no free line between the intermediate exchanges 23 and 12, an attempt is then made to extend the connection from the exchange 231 through the intermediate exchanges 23 and 24 to the exchange 12. In the intermediate exchange 23, the inability to obtain a line to the exchange 12 causes the relays MR7 and MR3 in the marker of the exchange 23 to operate and a voice frequency signal with the frequency *f7* is then sent backwards to the register REGA in the originating exchange 231 in which the relay RR7 operates in the manner described above. If the connection then is successfully extended to the marker M in the intermediate exchange 12, the voice frequency generator G6 (FIG. 5) in the exchange 231 remains connected to the speech wires and the voice frequency signal received at the marker M in the exchange 12 contains on one hand those two frequencies which indicate the exchange 34, and, on the other hand, the frequency *f6*. In this marker, the relays R3, R4 operate representing the called exchange 34. The relay R6 also operates in a circuit through the wires *t10* and *s34*. The contact 61 is actuated. If there is a free line to the exchange 15, the connection will be extended as has been described above. If there is no free line to the exchange 15, the relay MR7 will operate in the manner described above but the circuit previously extended through the wire *t6* is now interrupted by the open contact 61. Thus no alternative route can be connected. After a delay, the time arrangement AL that was started when the contact 204 in FIG. 7 was closed releases the marker.

It is not necessary to send a particular signal from the originating register REGA to prevent the selection of more than one roundabout route. Instead of sending the voice frequency signal with the frequency *f6*, the resigter REGA after the receipt of one revertive signal that activates the relay RR7 can be switched so that the next time a signal having the frequency *f7* is received, the register REGA will disconnect the connection. Upon selection between equivalent routes no revertive signal marking the roundabout route will be sent if only one of them is blocked, even if this is always selected first.

Figure 6:
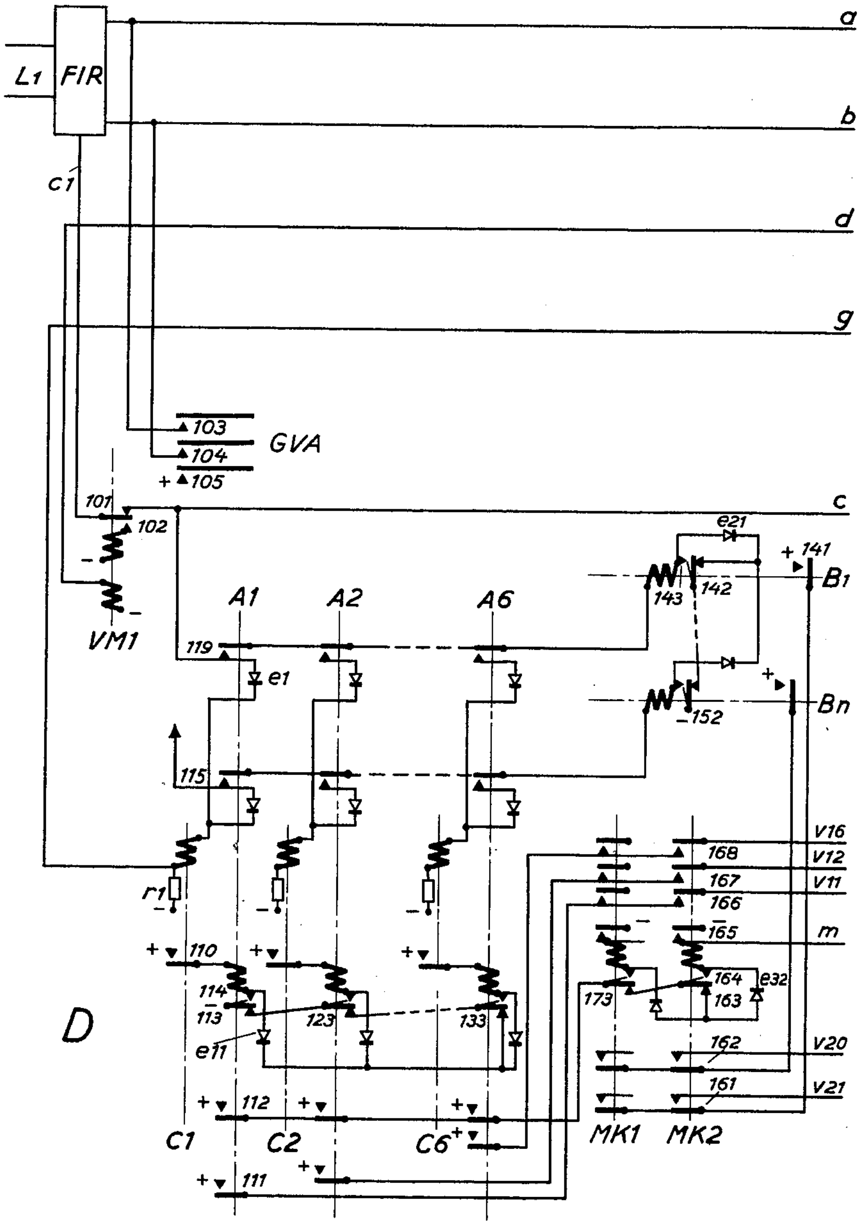
FIG. 6 shows an identifier, FIGS. 7–8 a marker and FIG. 9 a translator for an intermediate exchange according to FIG. 4.
Figure 7:
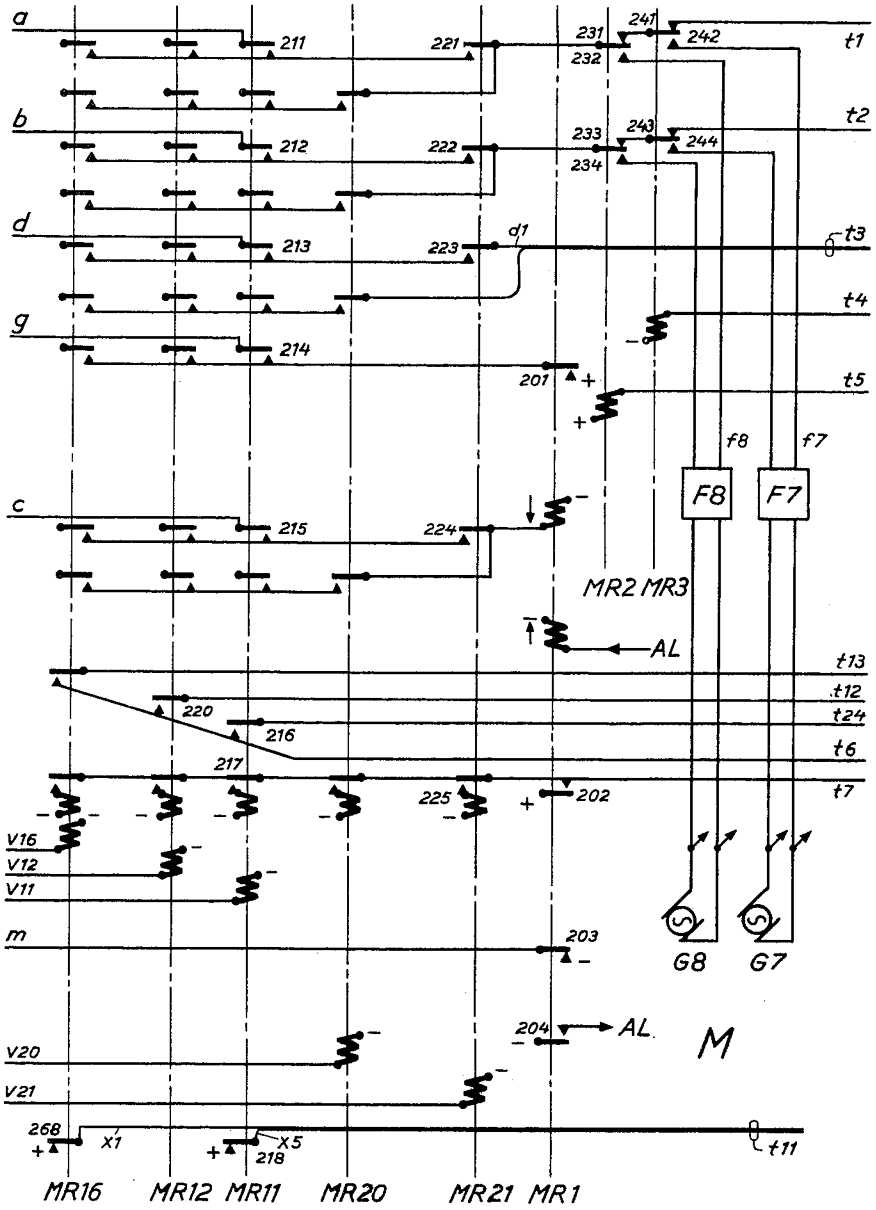

Calls outgoing from a local exchange connected directly to the intermediate exchange 12, for example the exchange 121, can be connected to more than two alternative routes. As has been mentioned above three different possibilities are presupposed. If the exchange 23 is called from the exchange 121, a first connection will be established directly to the exchange 23, secondly through the intermediate exchange 24, and thirdly through the intermediate exchange 13. The calls arrive in this case at the intermediate exchange 12 through local junction lines. These constitute a group of lines which in the identifier D according to FIG. 6 are represented by the relays C2 and A2. A call within this group of lines operates these relays and is connected to the marker by the operation of the relay MR12 in FIG. 7. Upon calls to the exchange 23, the relays R2 and R3 will operate, and the contacts 21–24 and 31–33 are closed. The relays MR8 and MR23 operate in a circuit through the wires *u14* and *s23* and the contacts 32, 22 and 72. The contact 514 is closed and the direct lines between the exchanges 12 and 23 are connected by the relay means K and are tested by the selecting relays VR1–VR*n*. If there is no free, direct line, none of the relays VR1–VR*n* will operate, nor will the relay MR5 operate. Instead the relay MR7 operates and the following circuit is completed: positive voltage, the winding of the relay MR6, the contacts 371 and 61, the wire *t6*, the contact 220, the wire *t12*, the contact 341, the wire *t12a*, the lower winding of the relay P24, the wires *u7* and *s23*, the contacts 32 and 22, the contact 72, to negative. The relays MR6 and P24 operate. The contacts 361 and 535 are actuated. The lines in the route between the exchanges 12 and 24 are tested as has been described above. If there is not a free line to the exchange 24, the relay MR4 will operate. The contacts 341–344 are actuated and the circuit through the wire *t12a* is switched to the wire *t12b*, the winding of the relay Q13, the wires *u8* and *s23*. The relay Q13 operates. The contact 521 is closed and the relay means K connects the lines of the route between the exchanges 12 and 13 to the selecting relays VR1–VR*n*. If there is a free line in this route, the marker will be released by means of the time arrangement AL.

Calls to a local exchange, for example 121, that is connected to the intermediate exchange 12 operate the relays R1 and R2 in FIG. 8. The relays R12 and MR2 operate in a circuit through the contacts 72, 21, and 12 and the wire *t5*. The contacts 81 and 231–234 are actuated. By means of the relay MR2, a revertive signal is sent to the register REGA of the originating exchange in FIG. 5. The signal is sent with a particular voice frequency *f8* that is generated by the voice frequency generator G8 and passes the filter F8. The relay RR8 operates, and the contact 410 closes a circuit that indicates that the called intermediate exchange has been connected and that the local number of the called subscriber is to be sent. The contact 81 operates the relay means K so that a local junction line is selected.

We claim:

1. A telephone system comprising a plurality of local offices having individual designations, a plurality of intermediate offices, a plurality of communication channels interconnecting the intermediate and local offices in a network in which a calling local office can reach a called office over a communication path including preferred and alternate routes involving different intermediate offices and channels, signal sending means in the calling local office for supplying signals representing the designation of the called office, alternate routing means in each of the intermediate offices responsive to the signals and the identity of the incoming channel to the intermediate office over which the signals were received for performing alternate routing operations in the intermediate offices in sequence in the order in which the intermediate offices are taken into the progressively extended communication path, means in the intermediate offices responsive to the selection of a given number of alternate routes by the alternate routing means for controlling the signal sending means in the local office to apply control signals to the communication path, and means in the intermediate offices responsive to the control signals for controlling the alternate routing means to select only preferred routes.

2. A telephone system comprising a plurality of offices having individual designations, a plurality of communication channels interconnecting the offices in a network in which a calling one of the offices can reach a called one of the offices over a communication path extended over routes including different intermediate ones of the offices and channels, routing means in the intermediate offices for selecting an outgoing channel from the intermediate offices for inclusion in the communication path representing a preferred route or an alternate route in dependence on the availability of channels at each intermediate office, and means responsive to the selection of a given number of alternate routes by the routing means in the intermediate offices of a communication path for preventing the selection and inclusion of any further alternate routes in this path and for enabling the selection of only preferred routes by the routing means in the intermediate offices.

3. A telephone system comprising a plurality of offices having individual designations, a plurality of communication channels interconnecting the offices in a network in which a calling one of the offices can reach a called one of the offices over a communication path extended over routes including different intermediate ones of the offices and channels, routing means in the intermediate offices for selecting different outgoing channels from the office representing preferred and alternate routes in dependence on the availability of channels at the intermediate offices in the communication path, means responsive to the selection of a given number of alternate routes by the routing means during the extension of the communication path for applying a control signal to the communication path, and means in the intermediate offices responsive to the control signal for changing the channels that can be selected by the routing means.

4. An automatic telephone system comprising a plurality of offices having individual designations, a plurality of communication channels interconnecting said offices in a network including preferred and alternate routes, said offices including both signal sending means supplying signals representing the designation of a called office and revertive signal receiving means associated with said sending means, alternate routing means in said offices controlled in accordance with the identity of an incoming channel and the designation of the called office, said alternate routing means performing alternate routing operations to select an outgoing channel, means controlled by said alternate routing means to send a revertive signal to the signal receiving means in the calling office when a call is extended over an alternate route, means controlled by said signal receiving means in the calling office when a revertive signal is received to supply an additional signal to the designation of the called office, and means controlled by the additional signal for controlling the alternate routing means in offices included in the alternate route to select only preferred routes.

5. An automatic telephone system comprising a plurality of offices having individual designations; a plurality of communication channels interconnecting said offices in a network including preferred and alternate routes; signal sending means in said offices supplying signals representing the designation of a called office, said offices also including revertive signal receiving means for controlling the sending means; alternate routing means in said offices responsive to the identity of an incoming channel and the designation of the called office for performing alternate routing operations to select an outgoing channel; means operated by said alternate routing means for sending a revertive signal to the calling office when the call is extended to an alternate route, said signal receiving means in the calling office being controlled by said revertive signal to control the associated signal sending means to supply a special signal to the designation of the called office when a given number of revertive signals are received; and means in the alternate routing means responsive to the special signal for controlling the alternate routing means in further offices connected in the route to select only preferred routes.

References Cited by the Examiner

UNITED STATES PATENTS

| | | | |
|---|---|---|---|
| 2,397,829 | 4/1946 | Avery | 179—18 |
| 2,700,702 | 1/1955 | Lesigne et al. | 179—18 |
| 2,857,467 | 10/1958 | Molnar | 179—18 |
| 2,932,695 | 4/1960 | Gottorel | 179—18 |
| 3,111,559 | 11/1963 | Jacobaeus et al. | 179—18 |

ROBERT H. ROSE, *Primary Examiner.*

WALTER L. LYNDE, *Examiner.*

S. H. BOYER, *Assistant Examiner.*